(12) United States Patent
Lin

(10) Patent No.: US 7,791,231 B2
(45) Date of Patent: Sep. 7, 2010

(54) ALTERNATOR STATOR ASSEMBLY STRUCTURE

(75) Inventor: Cheng Feng Lin, Taipei (TW)

(73) Assignee: Unipoint Electric Mfg Co., Ltd., Taipei (TW)

( * ) Notice: Subject to any disclaimer, the term of this patent is extended or adjusted under 35 U.S.C. 154(b) by 190 days.

(21) Appl. No.: 12/103,017

(22) Filed: Apr. 15, 2008

(65) Prior Publication Data

US 2009/0256436 A1   Oct. 15, 2009

(51) Int. Cl.
   *H02K 11/00* (2006.01)
(52) U.S. Cl. .................................. 310/68 D; 310/71
(58) Field of Classification Search ............... 310/71, 310/68 D
   See application file for complete search history.

(56) References Cited

U.S. PATENT DOCUMENTS

| | | | |
|---|---|---|---|
| 5,682,070 A * | 10/1997 | Adachi et al. ................. | 310/71 |
| 6,664,675 B2 * | 12/2003 | Kaizu ........................ | 310/68 D |
| 6,800,974 B2 * | 10/2004 | Shichijyo ..................... | 310/71 |
| 6,867,517 B2 * | 3/2005 | Kumagai ................... | 310/68 D |
| 6,936,941 B2 * | 8/2005 | Oohashi et al. ........... | 310/68 D |

* cited by examiner

*Primary Examiner*—Dang D Le
(74) *Attorney, Agent, or Firm*—Ming Chow; Sinorica, LLC

(57) ABSTRACT

The alternator stator assembly structure with outwardly extending wire is disclosed. The alternator stator assembly structure includes a stator, a rotor, a rectifier and a plurality of connecting components. The stator includes a plurality of conducting wires extended outwardly thereon. The rotor is passed through the stator. The rectifier is disposed on the stator and has a plurality of connecting portions. Each connecting component has a base and a constraining wall, and the base is engaged and electrically connected to corresponding connecting portion by concavo-convex engagement or screwing, and the conducting wire is fastened by clamping of the constraining wall for adjusting or welding conveniently, so that the stator and the rotor can connect electrically.

18 Claims, 6 Drawing Sheets

ALTERNATOR STATOR ASSEMBLY STRUCTURE

FIELD OF THE INVENTION

The present invention relates to an alternator stator assembly structure, and more particularly to a vehicle alternator comprising a stator and a rectifier.

BACKGROUND OF THE INVENTION

FIG. 1 illustrates the three dimensional view of the first embodiment of the alternator of the prior art. This embodiment is applied on the alternator operating less than 60 ampere. The alternator 1 comprises a rotor 11, a stator 12, a rectifier 13, a plurality of bolts 15 and a cover 14.

The stator 12 comprises a coil 121 formed by a plurality of conducting wires wrapped with each other, a magnet 122 disposed on the outer edge and inner edge of the coil 121, and a plurality of conducting wire 123 extended outwardly from coil 121.

The cover 14 is disposed above the stator 12, and between the stator 12 and the rectifier 13, for protecting the stator 12.

The rotor 11 is disposed through the axis of the stator 12. While the rotor 11 is rotating, the electromagnetic induction occurs between the rotor 11 and the stator 12 so that the alternator 1 can generate the electricity.

The rectifier 13 has at least one rectifying circuit (not shown) which is disposed above of the stator 12, for rectifying the alternate current (AC) into the direct current (DC). A plurality of connecting portions 131 are disposed in spaced-apart order on the outer edge of the rectifier 13, and each connecting portion 131 has a base wall 132 and a extending wall 136 extended from the outer edge of the base wall 132. The base wall 132 has a conducting terminal 134, a first hole 133 and a second hole 135, and the conducting terminal 134 is electrically connected to the rectifying circuit. The second hole 135 is disposed adjacent to the outer edge of the base wall 132, for providing the conducting wire 123 to pass through thereon, so that the conducting wire 123 can extend from stator 32 to the connecting portion 131.

In the prior art, the conducting wire 123 is engaged onto the corresponding connecting portion 131 by using a bolt 15 which passes through the first hole 133 and is fixed on the connecting portion 131, then the conducting wire 123 is wrapped onto the rod of the bolt 15, so that the conducting wire 123 can electrically connect to the connecting portion 131. However, the disadvantage of prior art is that break of the conducting wire 123 occurs frequently during the bending process because of the repeating blending action or the over-bending action by the operator. Besides, the conducting wire 123 warped on the bolt 15 also slips from the bolt possibly due to vibration, and the slip of the conducting wire 123 may cause the losses of the electrically connection between the conducting wire 123 and the connecting portion 131.

FIG. 2 illustrates the three dimensional view of the second embodiment of the alternator of the prior art. This embodiment is applied on the alternator operating over 60 ampere. The alternator 2 comprises a rotor 11, a stator 12, a rectifier 23, a plurality of bolts 25 and a cover 14. The structure and the function of the rotor 11, the stator 12 and the cover 14 are identical as the first embodiment, are not illustrated in this embodiment in unnecessary details.

The rectifier 23 has a rectifying circuit (not shown) and is disposed above the stator 12 for rectifying the alternate current into the direct current. A plurality of connecting portions 231 is disposed in spaced-apart order on the outer edge of the rectifier 23. Each connecting portions 231 has a base wall 232 disposed vertically and two extending walls 235 extended outwardly from the two side of the base wall 232. The base wall 232 has a hole 125 and a conducting terminal 124 which is electrically connected to the rectifying circuit.

When fastening the conducting wire 123 on the corresponding connecting portion 231, the operator will measure the distance between the rectifier 23 and the stator 12 by naked eye in advance, and then cut the conducting wire 123 to suitable length, and solder a conductive terminal 234 having a hole 233 onto the end of the conducting wire 123, and the bolt 25 through the hole 233 and corresponding hole 125 to fasten and electrically connect the conducting wire 123 with the corresponding connecting portion 231.

Because of inaccurateness of measuring by the naked eye, it is difficult for the operator to cut the conducting wires 123 to substantially equal lengths, and.

SUMMARY OF THE INVENTION

Thereafter, one of objectives of the present invention is to provide an alternator stator assembly structure, for improving the facilitation of assembling the stator and the rectifier, and preventing the losses of electrically connection.

The present invention provides an alternator stator assembly structure, comprising a stator, a rotor, a rectifier and a plurality of connecting components. The stator comprises a plurality of conducting wires extended thereon outwardly. The rotor passes through the stator. The rectifier is disposed on the stator and has a plurality of connecting portion. Each connecting component has a constraining wall and a base which can be concavo-convex engaged with the corresponding connecting portion to make connecting component electrically connect to the connecting portion. The constraining wall is electrically connected to the corresponding conducting wire. Therefore, the stator can electrically connect to the rectifier.

Besides, the present invention further provides an alternator stator assembly structure, comprising a stator, a rotor, a rectifier, a plurality of constraining components and a plurality of connecting components. The stator comprises a plurality of conducting wires extended outwardly. The rotor passes through the stator. The rectifier is disposed on the stator and has a plurality of connecting portion. Each connecting component has a base and a constraining wall. Each base has a hole which is passed by the corresponding constraining component therethrough for engaging the connecting component onto the corresponding portion. Each the constraining wall is electrically connected to corresponding conducting wire so that the stator is electrically connected to the rectifier.

Besides, the present invention further provides a connecting component for electrically connecting a stator and a rectifier. The stator has a conducting wire extended outwardly and rectifier has a connecting portion. The connecting component has a base and a constraining wall extended from one side of the base. The base has a hole which is passed by a constraining component therethrough so as to engage the connecting component onto the connecting portion. The constraining wall is for clamping and fastening the conducting wire.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENTS

To make it easier for our examiner to understand the present invention, the following detailed description with reference to the accompanying drawings of embodiments are given for example, but such preferred embodiment is not intend to limit the scope of the present invention. For simplicity, like numerals are used for like elements as described in the specification of the present invention.

Figure 1:
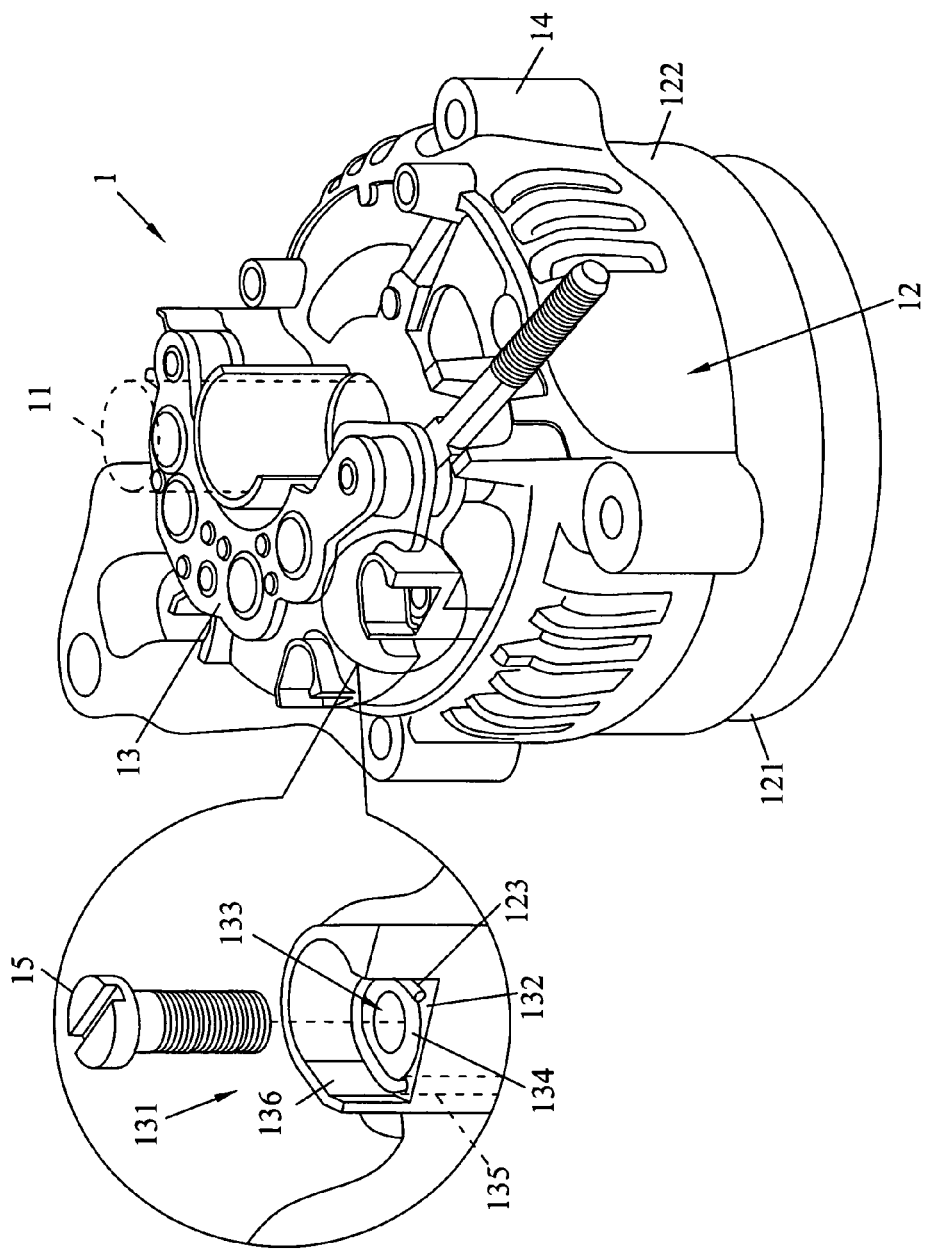
FIG. 1 illustrates a three dimensional view of the first embodiment of the alternator of the prior art.
Figure 2:
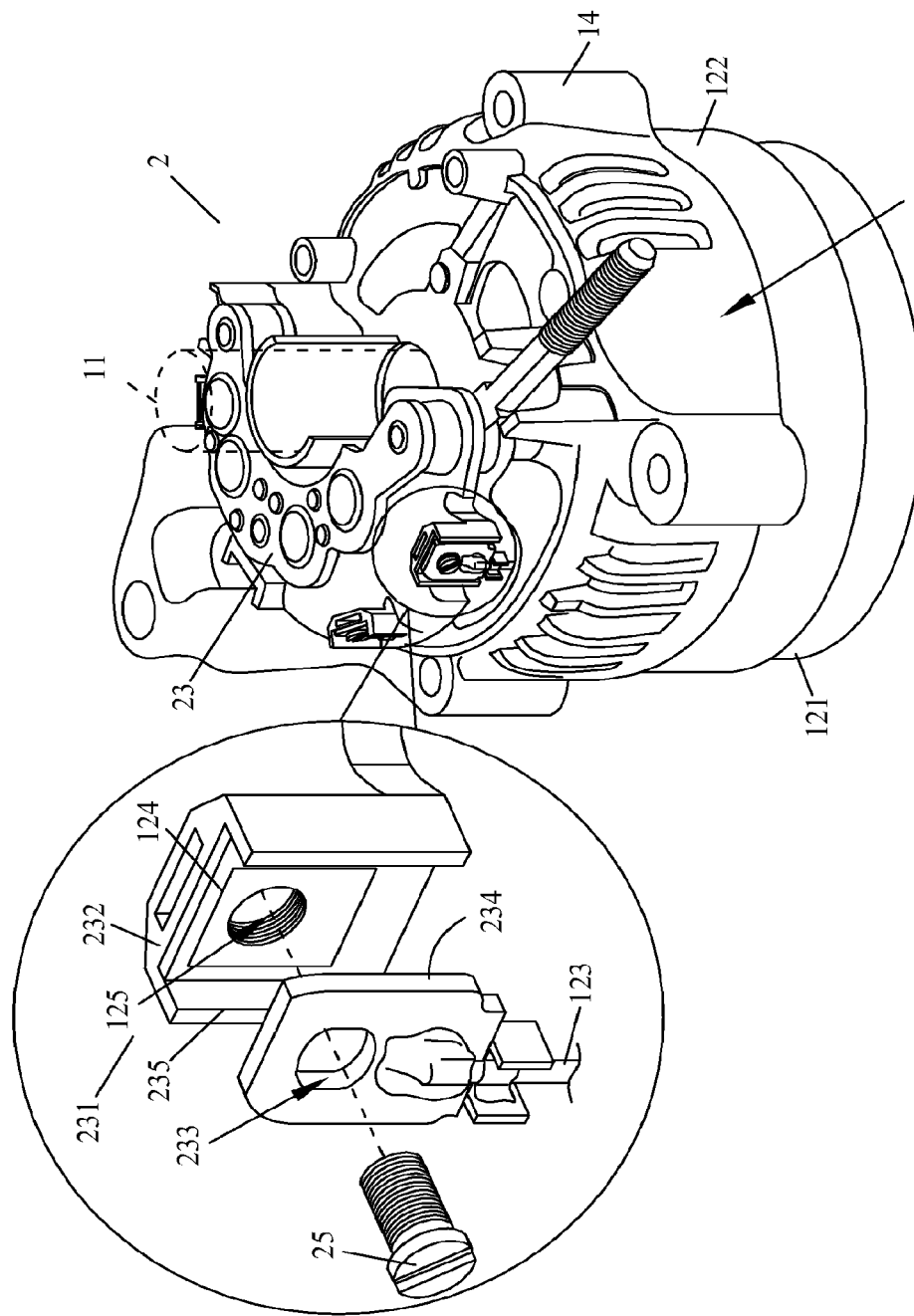
FIG. 2 illustrates a three dimensional view of the second embodiment of the alternator of the prior art.
Figure 3:
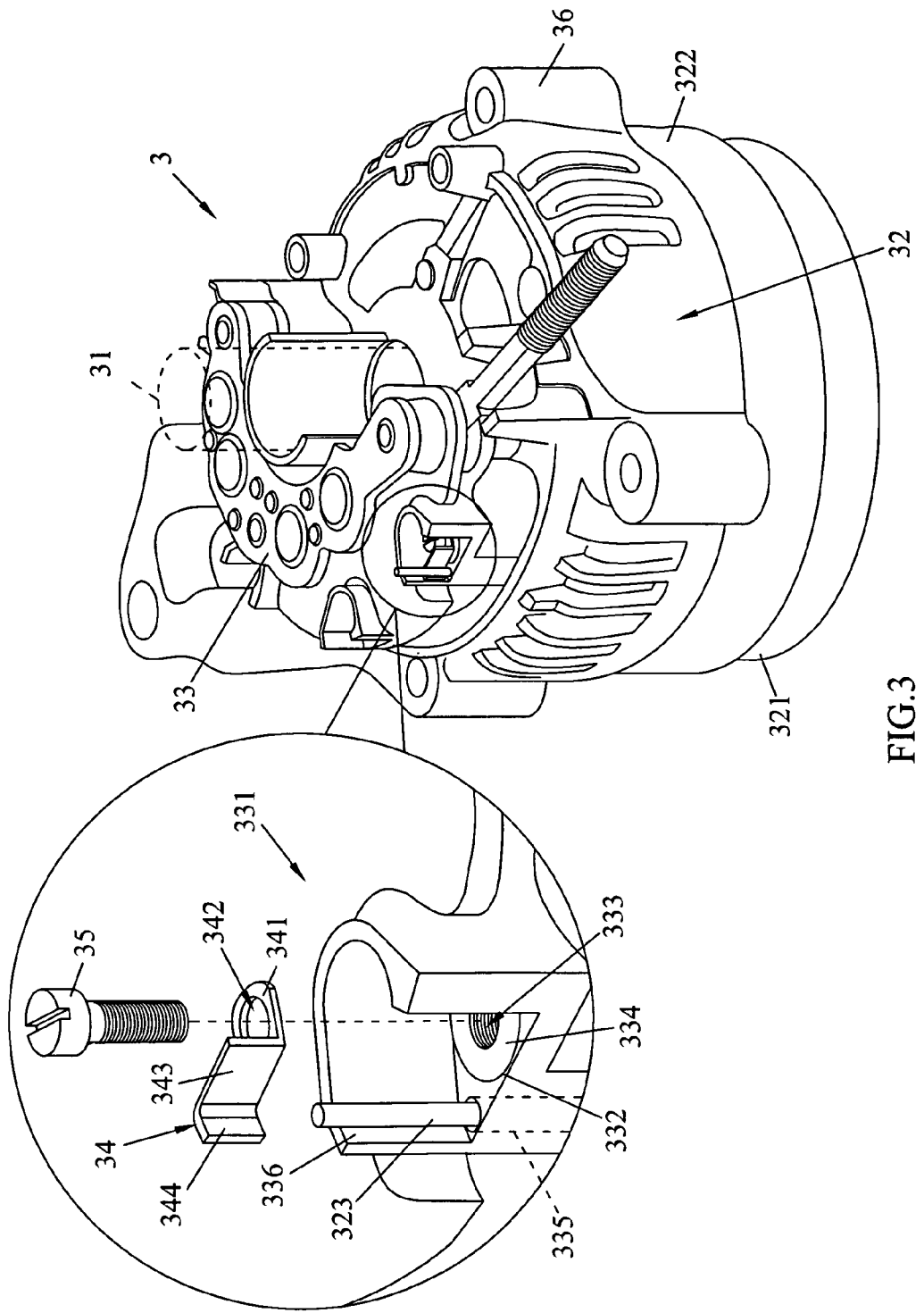
FIG. 3 illustrates a three dimensional view of the first embodiment of the alternator stator assembly structure of the present invention.

FIG. 3 illustrates a three dimensional view of the first embodiment of the alternator stator assembly structure in accordance with the present invention. The alternator 3 comprises a rotor 31, a stator 32, a rectifier 33, a plurality of connecting component 34, a plurality of constraining component 35 and a cover 36. Preferably, the constraining component 35 can be a bolt, a screw, a screw nail or a rivet.

The stator 32 comprises a coil 321 formed by a plurality of conducting wires wrapped with each other, a magnet 322 disposed on the outer edge and inner edge of the coil 321, and a plurality of conducting wire 323 extended outwardly from coil 321. The coil 321 is illustrated simply in figure.

The cover 36 is for covering on the top of the stator 32 and locates between the stator 32 and the rectifier 33, for protecting the stator 32.

The rotor 31 is passed through the axis of the stator 32. While the rotor 31 is rotating, the electromagnetic induction is occurred between the rotor 31 and the stator 32 so that the alternator 3 can generates the electricity.

The rectifier 33 has a rectifying circuit (not shown) and is disposed above the stator 32, for rectifying the alternating current into the direct current. A plurality of connecting portions 331 are disposed in spaced-apart order on the rectifier 33, and each connecting portions 331 has a base wall 332 and a extending wall 336 extended upwardly from the outer edge of the base wall 332. The base wall 332 has a conducting terminal 334, a first hole 333 and a second hole 335. The conducting terminal 334 is electrically connected to the rectifying circuit. The second hole 335 is disposed near the outer edge of the base wall 332, and for providing the conducting wire 323 to pass through thereon, so that the conducting wire 323 can extend from stator 32 to the connecting portion 331.

The connecting component 34 has a base 341 and a constraining wall 343 extended from one side of the base 341. The base 341 has a hole 342 and a constraining portion 344 is extended from the constraining wall 343 near one side of the extending wall 336. The shape of the constraining portion 344 can be an arc line, a square line or a combination of any line segment.

When the connecting component 34 is engaged onto the corresponding connecting portion 331, the location of the hole 342 of the base 341 matches the location of the hole 333 of the corresponding connection potion 331, so that the constraining component 35 can pass the hole 331 and hole 333, and engage the connecting component 34 and the connecting portion 331 together, and the conducting wire 323 is forced to be disposed between the constraining wall 343 and the constraining portion 344. Therefore, the conductive wire 323 is clamped by the constraining wall 343 and the constraining portion 344 to which they are electrically connected.

Preferably, the conducting wire 323, the constraining wall 343 and the constraining portion 344 can be soldered with each other for preventing the slipping of the conducting wire 323 from the constraining wall 343 and the constraining portion 344 due to vibration generated by operating the alternator 3, and losses of electrically connection can also be prevented.

Figure 4:
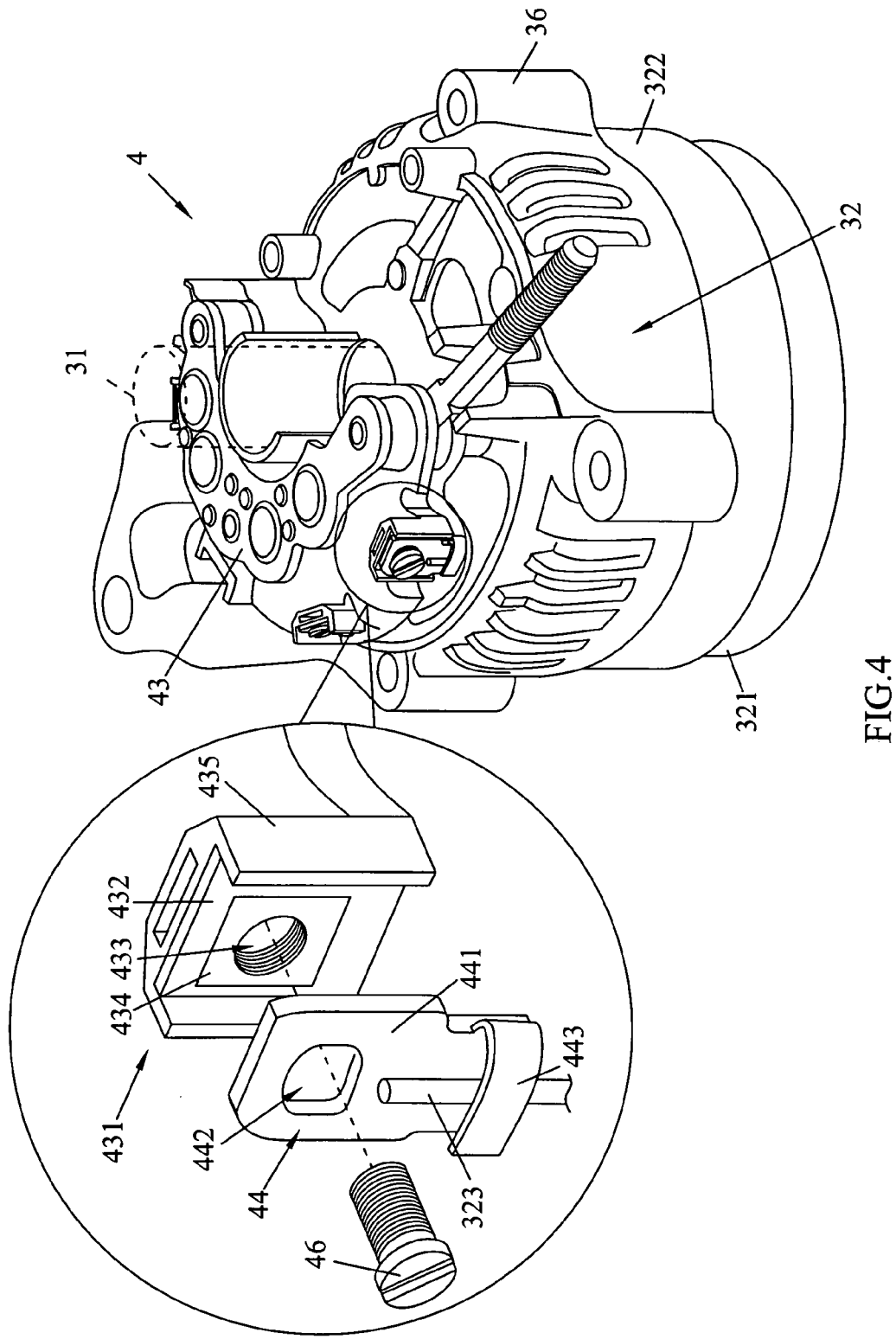
FIG. 4 illustrates a three dimensional view of the second embodiment of the alternator stator assembly structure of the present invention.

FIG. 4 illustrates a three dimensional view of the second embodiment of the alternator stator assembly structure in accordance with the present invention. The alternator 4 comprises a rotor 31, a stator 32, a rectifier 43, a plurality of connecting components 44, a cover 36 and a plurality of constraining components 46. In this embodiment, the constraining component 46 can be implemented by either one of the bolt, a screw, a screw nail or a rivet. Besides, the structure and the function of the rotor 31, the stator 32 and the cover 36 are identical as the first embodiment, are not illustrated in this embodiment in unnecessary details.

The rectifier 43 has a rectifying circuit (not shown) and is disposed above the stator 32, and for rectifying the alternative current into the direct current. A plurality of connecting portion 431 are disposed on the outer edge of the rectifier 43, and each connecting portion 431 has a vertically disposed base wall 432 and two extending walls 435 extended from two side of the base wall 432 respectively. The base wall 432 has a conducting terminal 434 and a hole 433, and the conducting terminal 434 is electrically connected with the rectifying circuit. The conducting wire 323 is extended between the two extending walls 435.

The connecting component 44 has a base 441 and a constraining wall 443 extended from one side of the base 441. The base 441 has a hole 442. In this embodiment, the constraining wall 443 is implemented by a shape of curving, but not limited, the constraining wall 443 can be, an arc line, square line or the combination of any line segment, if necessary.

When the connecting component 44 is engaged onto the corresponding connecting portion 431, the location of the hole 442 of the base 411 corresponds to the location of the location of the hole 433 of the connecting portion 431, so that the constraining component 46 can be used to pass through the hole 442 and the hole 433 for engaging the connecting component 44 onto the connecting portion 431, and the conductive wire 323 is clamped on the base 441 and the constraining wall 443. Therefore, the conductive wire 323 can electrically connect to conducting terminal 434 due to clamping of the base 441 and the constraining wall 443. Besides, the conducting wire 323 can be soldered with the base 441 and the constraining wall 443, in order to prevent the slipping of the conducting wire 323 due to vibration generated by operating of the alternator, and the losses of electrical connection can also be prevent. By disposing the connecting component 44, the conducting wire 323 will not easily slip from the rectifier 43, and the rectifier 43 will not easily incline thereon while being disposed on the stator 32.

Figure 5:
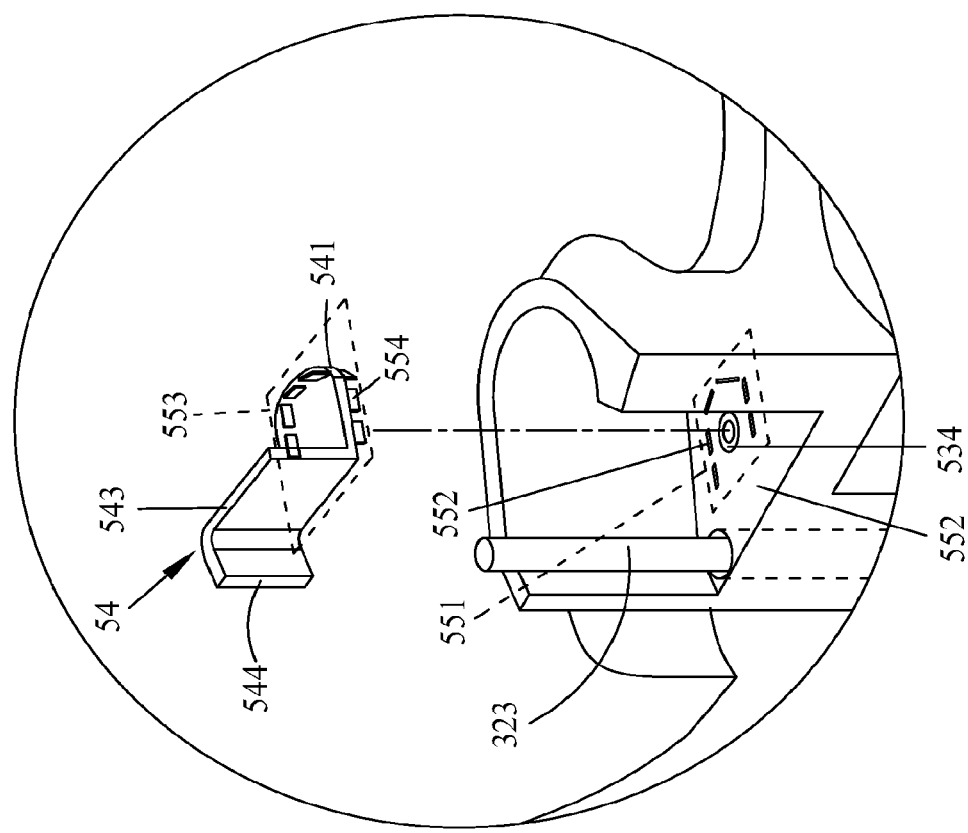
FIG. 5 illustrates a three dimensional view of the third embodiment of the alternator stator assembly structure of the present invention.

FIG. 5 illustrates a three dimensional view of the third embodiment of the alternator stator assembly structure in accordance with the present invention. The difference between the third embodiment and the first embodiment is that a protruding portion 533 having a plurality of convex portions 538 is formed at the edge of the base wall 532, and a clipping portion 542 having a plurality of concave portion 543 is formed on the edge of the base wall 532. The protruding portion 533 can be concavo-concave engaged onto the clipping portion 542 by riveting the convex portion 538 onto the corresponding concave portion 543 or using other ways, and the convex portion 538 can generating plastic deformation to fit the shape of the concave portion 543 for tightly engaging onto the concave portion 543. Preferably, the convex portion 538 and the concave portion 543 can be integrally formed.

Besides, the conducting wire 323, the constraining wall 543 and the constraining portion 544 can be soldered together to prevent the losses of electrically connection due to slip of the conducting wire 323 from the constraining wall 543 caused by the vibration generated by operating the alternator 3.

Figure 6:
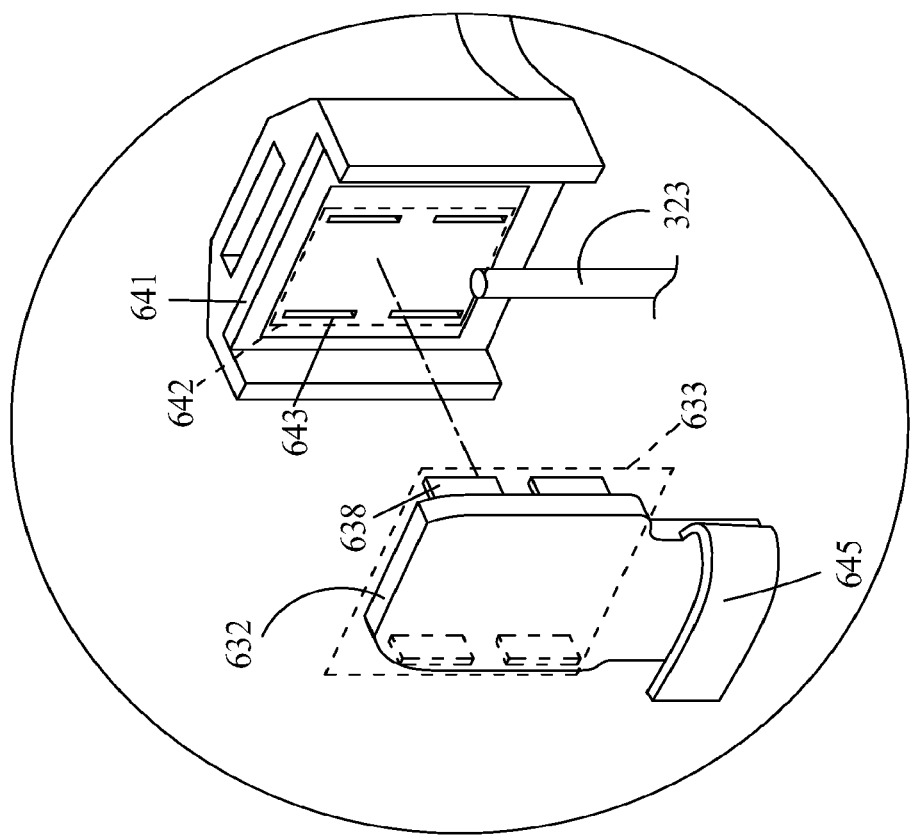
FIG. 6 illustrates a three dimensional view of the fourth embodiment of the alternator stator assembly structure of the present invention.

FIG. 6 illustrates a three dimensional view of the fourth embodiment of the alternator stator assembly structure in accordance with the present invention. The difference between the fourth embodiment and the second embodiment is that a protruding portion 633 is formed on the edge of the base 632, which has a plurality of convex portions 638, and a clipping portion 642 is formed on the edge of the base 641, which has a plurality of concave portion 643. The protruding portion 633 can be concavo-concave engaged onto the clipping portion 642 by riveting the convex portion 638 onto the corresponding concave portion 643 or using other methods, and the convex portion 638 can generate the plastic deformation to fit the shape of the concave portion 643 for tightly engaging onto the concave portion 643. Preferably, the protruding portion 633 and the convex portion 638 can be integrally formed. Besides, the conducting wire 323, the constraining wall 645 and the base 632 can be soldered together to prevent the losses of electrically connection due to the slip of the conducting wire 323 from the constraining wall 645 caused by the vibration generated by operating the alternator.

The first advantage of this invention is that the conducting wire and the conducting terminal are connected directly with the connecting component, so the break of the conducting wire during the bending process due to the repeating blending action or the over-bending action by the operator in prior art can be prevented. Thus the goal of the present invention can be achieved.

Besides, the other drawback of the prior art also can be solved. The drawback that the rectifier 23 usually inclines relative to stator 12 when being disposed thereon, can also be overcome by using the connecting component of this invention.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An alternator stator assembly structure, comprising:
    a stator, having a plurality of conducting wires extended outwardly;
    a rotor, passed through said stator;
    a rectifier, disposed on said stator and having a plurality of connecting portions, each of said connecting portions defining a concave recess with a base wall and an extending wall extending upwardly from at least a portion of the outer edge of said base wall; and
    a plurality of connecting components, said connecting components being independent of each other, each said connecting component having a base and a constraining wall, wherein said bases of said connecting components are concavo-convex engaged and electrically connected to corresponding said recesses, and said constraining walls are electrically connected to said conducting wires so that said stator is electrically connected with said rectifier.

2. The alternator stator assembly structure of claim 1, wherein said base has a protruding portion and said connecting portion has a clipping portion, and said base clips to a corresponding one of said clipping portion by said protruding portion.

3. The alternator stator assembly structure of claim 1, wherein said constraining wall is connected to said corresponding conducting wire by welding.

4. The alternator stator assembly structure of claim 1, wherein said connecting portion concaves a containing space, and said conducting wire is passed through said containing space to electrically connect with said constraining wall.

5. The alternator stator assembly structure of claim 1, wherein said constraining wall extends from one side of said base, and one end of said conducting wire is located between said base and said constraining wall.

6. The alternator stator assembly structure of claim 1, wherein said constraining wall further has a constraining portion extended from one side of said constraining wall, and one end of said conducting wire is located between said constraining wall and said constraining portion.

7. An alternator stator assembly structure with outwardly extending wire, comprising:
    a stator, having a plurality of conducting wires extended outwardly;
    a rotor, passed through said stator;
    a rectifier, disposed on said stator and having a plurality of connecting portions each of said connecting portions defining a concave recess with a base wall and an extending wall extending upwardly from at least a portion of the outer edge of said base wall;
    a plurality of constraining components; and
    a plurality of connecting components, said connecting components being independent of each other, each of said connecting components having a base and a constraining wall, wherein each said base has a hole which is passed by one of said constraining components therethrough so as to engage said connecting component onto a corresponding one of said recesses, and each said constraining wall is electrically connected to a corresponding one of the plurality of conducting wires so that said stator is electrically connected with said rectifier.

8. The alternator stator assembly structure of claim 7, wherein said constraining component is selected from a group consisting of a bolt, a screw, a screw nail and a rivet.

9. The alternator stator assembly structure of claim 7, wherein said containing wall is electrically connected to said corresponding one of said plurality of conducting wires by welding.

10. The alternator stator assembly structure of claim 7, wherein said connecting portion further concaves a containing space, and said conducting wire passes through said containing space to electrically connect with said constraining wall.

11. The alternator stator assembly structure of claim 7, wherein said constraining wall extends from one side of said base, and one end of said conducting wire is located between said base and said constraining wall.

12. The alternator stator assembly structure of claim 7, wherein said constraining wall further comprises a constraining portion extended form one side of said constraining wall, and one end of said conducting wire is located between said constraining wall and constraining portion.

13. A connecting component for electrically connecting a stator and a rectifier, said stator having a conducting wire extended outwardly, and said rectifier having a connecting portion defining a concave recess with a base wall and an extending wall extending upwardly from at least a portion of the outer edge of said base wall, said connecting component comprising:

a base, having a hole which is passed by a constraining component therethrough to engage said connecting component onto said recess, and a constraining wall, extended from one side of said base, for clamping and fastening said conducting wire;

wherein said connecting component is independent of other said connecting components.

14. The connecting component of claim 13, wherein said constraining component is selected from a group consisting of a bolt, a screw, a screw nail and a rivet.

15. The connecting component of claim 13, wherein said constraining wall is connected to said conducting wires by welding.

16. The connecting component of claim 13, wherein said connecting portion further concaves a containing space, and said conducting wire passes through said containing space to electrically connect to said constraining wall.

17. The connecting component of claim 13, wherein said constraining wall extends from one side of said base, and one end of said conducting wire is located between said base and said constraining wall.

18. The connecting component of claim 13, wherein said constraining wall further comprises a constraining portion extended from one side of said constraining wall, and one end of said conducting wire is located between said constraining wall and said constraining portion.

* * * * *